(12) United States Patent
Cooper et al.

(10) Patent No.: US 9,043,794 B2
(45) Date of Patent: May 26, 2015

(54) SCALABLE GROUP SYNTHESIS

(75) Inventors: Steven Cooper, Markham (CA); Peter Andrew Nicholls, Markham (CA); Roger Harry Pett, Markham (CA); Jeremiah Stephen Swan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 13/527,695

(22) Filed: Jun. 20, 2012

(65) Prior Publication Data

US 2013/0117748 A1    May 9, 2013

(30) Foreign Application Priority Data

Jun. 20, 2011   (CA) .................................... 2743849

(51) Int. Cl.
*G06F 9/46*    (2006.01)
*G06F 9/54*    (2006.01)
*G06F 11/36*    (2006.01)

(52) U.S. Cl.
CPC .............. *G06F 9/54* (2013.01); *G06F 11/3604* (2013.01)

(58) Field of Classification Search
CPC ........ G06F 9/4843; G06F 9/52; G06F 9/4881
See application file for complete search history.

(56) References Cited

U.S. PATENT DOCUMENTS

| | | | |
|---|---|---|---|
| 6,625,639 B1 * | 9/2003 | Miller et al. ................... | 718/106 |
| 6,671,695 B2 * | 12/2003 | McFadden .................... | 707/656 |
| 6,823,512 B1 * | 11/2004 | Miller et al. ................... | 718/103 |
| 7,409,569 B2 * | 8/2008 | Illowsky et al. .............. | 713/323 |
| 7,454,542 B2 * | 11/2008 | Illowsky et al. ................ | 710/62 |
| 7,516,457 B2 * | 4/2009 | Eilam et al. .................... | 718/104 |
| 7,793,333 B2 * | 9/2010 | Goh et al. .......................... | 726/1 |
| 8,301,581 B2 * | 10/2012 | Zmolek ............................ | 706/62 |
| 8,533,714 B2 * | 9/2013 | Lorenc et al. ..................... | 718/1 |
| 2002/0152254 A1 * | 10/2002 | Teng ............................. | 709/100 |
| 2003/0126137 A1 * | 7/2003 | McFadden .................... | 707/100 |
| 2008/0235702 A1 * | 9/2008 | Eilam et al. .................... | 718/104 |
| 2010/0162260 A1 * | 6/2010 | Ibrahim ........................ | 718/105 |

* cited by examiner

*Primary Examiner* — Van Nguyen
(74) *Attorney, Agent, or Firm* — Holland & Knight LLP; Brian J. Colandreo, Esq.; Jeffrey T. Placker, Esq.

(57) ABSTRACT

An illustrative embodiment of a computer-implemented process for scalable group synthesis receives a group definition, applies a sub-set of conditions to the group definition to form a conditioned group definition, receives a set of entities and populates group membership using the received set of entities and the conditioned group definition, wherein each member responds in the affirmative to the sub-set of conditions.

45 Claims, 8 Drawing Sheets

Grouping system 300

SCALABLE GROUP SYNTHESIS

RELATED APPLICATIONS

The subject application claims priority of Canadian Patent Application Serial No. 2743849, filed on Jun. 20, 2011. The entire contents of the aforementioned application is incorporated herein by reference.

BACKGROUND

This disclosure relates generally to large scale processing in a data processing system.

Applications executing at a peta-scale, executing more than one quadrillion operations per second, can be comprised of a million or more execution contexts or threads. This extremely large scale may present significant challenges to conventional debug approaches.

A typical objective of any debugging technique applied to a massively parallel application is locating a small number of failing processes, so conventional debugging techniques can be applied to those failing processes to examine in detail. Dealing with the volume of information available when debugging massively parallel applications has typically generated a set of approaches to the problem.

In one approach, a user inserts a logging capability of some kind into an application of interest. The logging capability may take the form of trace statements, with the simplest form being print statements. In another approach, the application may traps and generates a core dump, enabling the user to examine the resulting core dumps. In another approach a conventional debugger such as those obtained from a tools vendor, may used. The debugger may allow real-time examination and control of the application. However each debugger can typically only view a single process within a peta-scale application, typically resulting in an inability to provide guidance for the user to determine which thread or process needs to be debugged. In the context of the previous approach, tools may group execution contexts, and operate on a group of execution contexts using an interface similar to a conventional debugger. Although grouping solves a problem of reducing an amount of information presented to a user, the grouping activity typically introduces a difficulty associated with creating the groups of execution contexts.

SUMMARY

According to one embodiment, a computer-implemented process for scalable group synthesis receives a group definition, applies a sub-set of conditions to the group definition to form a conditioned group definition, receives a set of entities and populates group membership using the received set of entities and the conditioned group definition, wherein each member responds in the affirmative to the sub-set of conditions.

According to one embodiment, a computer program product for scalable group synthesis comprises a computer readable storage medium includes computer executable program code stored thereon. The computer executable program code comprises computer executable program code for receiving a group definition, computer executable program code for applying a sub-set of conditions to the group definition to form a conditioned group definition, computer executable program code for receiving a set of entities and computer executable program code for populating group membership using the received set of entities and the conditioned group definition, wherein each member responds in the affirmative to the sub-set of conditions.

According to one embodiment an apparatus for scalable group synthesis, comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a group definition, apply a sub-set of conditions to the group definition to form a conditioned group definition, receive a set of entities and populate group membership using the received set of entities and the conditioned group definition, wherein each member responds in the affirmative to the sub-set of conditions.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
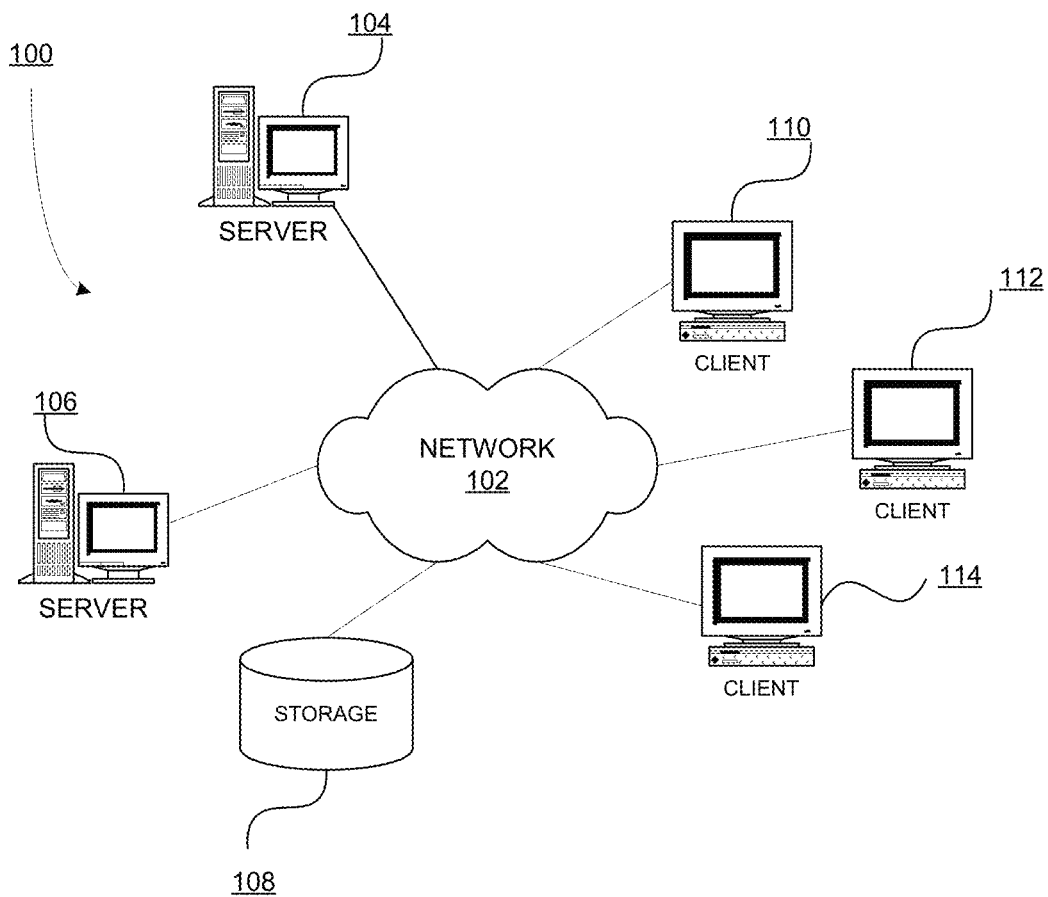
FIG. 1 is a pictorial representation of a network of data processing systems in which illustrative embodiments may be implemented.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
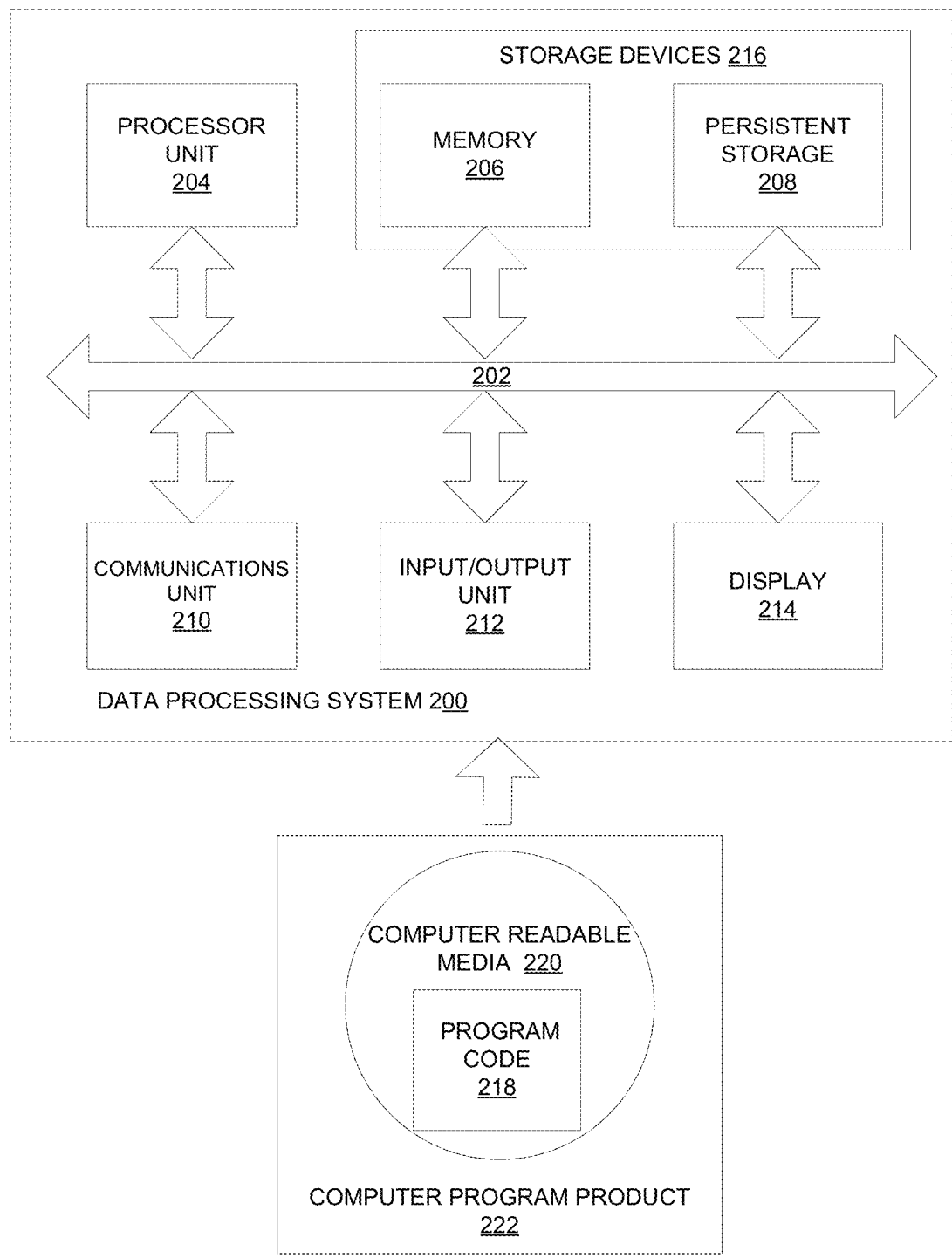
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for scalable group synthesis using processor unit 204 may receive a group definition from storage devices 216, or by communications unit 210 over network 102 of network data processing system 100 of FIG. 1. Processor unit 204 may apply a sub-set of conditions to the group definition to form a conditioned group definition, and may receive a set of entities. Processor unit 204 may populate group membership using the received set of entities and the conditioned group definition, wherein each member may respond in the affirmative to the sub-set of conditions. Selection of a sub-set of conditions from the set of conditions typically may occur as a response from a user prompt from a user interface on display unit 214.

The groups thus formed may be dynamic and transitive. In an example embodiment, enumeration of members may not be performed and may not be a list of members maintained because the group membership may be determined by group member candidates. For example agents in an infrastructure hierarchy, in response to the set of conditions applied to the set of entities, may solicit responses for membership from candidates. Accordingly a group definition may not have members and may not use much resource.

In an alternative embodiment, program code 218 containing the computer-implemented process may be stored within computer readable media 220 as computer program product 222. In another illustrative embodiment, the process for scalable group synthesis may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus may execute the computer executable program code to direct the apparatus to perform the process of group forming.

An approach in which entities are organized into groups operated on in parallel has merit, but may suffer from a difficulty of generating groups. Illustrative embodiments of the disclosed process may provide examples of a highly scalable group synthesis (or forming) mechanism that may be capable of operating on a large distributed population without requiring a user to explicitly enumerate members of the group. In an example embodiment, instead of the user predefining the group membership, a debug engine attached to each execution context may determine whether the execution context is a member of a group based on results of simple queries. The absence of the requirement for enumeration may provide a useful feature of the illustrative embodiments the disclosed process. Conceptually, a user may define conditions, which describe group membership, and a debugger may then determines, using the user-defined conditions, whether an execution context is a member of the group.

From the point of view of a user, illustrative embodiments of the disclosed process may provide a simple mechanism to locate a failing portion of an application. For example, when an application hangs because some entities have not reached a barrier point, a query such as a context is in the group if the execution context is not blocked may be used to form a group. As a result, the user may not be required to know, a priori, which contexts are in the group because the entities select themselves.

Using the disclosed process may enable grouping of entities to be dynamic. For example, groups can be defined for execution context states, including blocked, running, stopped, and so on. Entities, of the example, may join or leave the groups dynamically dependent upon a respective execution context state. Further, using the disclosed process, a group of entities may be used as a target population for further grouping queries, for example, using a divide and conquer strategy to focus on a small group of failing entities. The disclosed process may further provide a capability to examine an arbitrary member of the group in detail, for example, by using a conventional debugger on an arbitrary member of the group.

Although the examples previously presented and to be presented, associated with the disclosed process use debugging, the disclosed process has potential applicability beyond parallel debug. The examples are therefore intended to be illustrative only and not limiting the disclosed process to the examples provided herewith.

Figure 3:
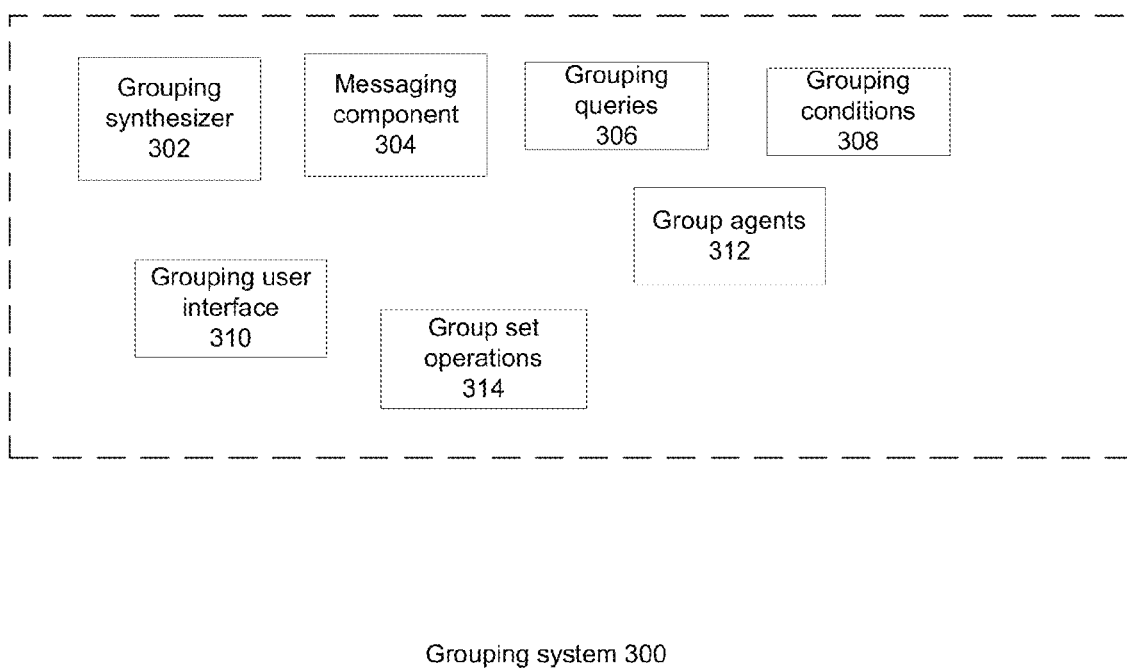
FIG. 3 is a block diagram of a grouping system, in accordance with an embodiment of the disclosure.

With reference to FIG. 3, a block diagram of a grouping system, in accordance with an embodiment of the disclosure is presented. Grouping system 300 is an example of a grouping system, framework or mechanism providing a capability of dynamically categorizing entities into a specific set of groups using attributes of the entities.

Grouping system 300 may leverage a foundation of an underlying data processing system such as data processing 200 of FIG. 2. Grouping system 300 may further provide a capability of operating across a network of data processing systems such as network data processing system 100 of FIG. 1 in which components may be implemented locally, in a distributed manner or a combination thereof.

Grouping system 300 may include a number of components, which may be implemented individually, or in predetermined combinations as required without affecting the overall function of the system. Grouping system 300 may include components providing functional capabilities of grouping synthesizer 302, messaging component 304, grouping queries 306, grouping conditions 308, grouping user interface 310, group agents 312, and grouping set operations 314.

Grouping synthesizer 302 may provide a capability for creating groups using input received in the form of individual, or sets of, grouping queries 306, or grouping conditions 308 or group set operations 314 to process received entities representative of a data population of interest. Grouping synthesizer 302 may further provide a query execution capability to process selection or search requests, such as grouping queries 306 against a population of entities.

For example grouping synthesizer 302 may be invoked to form a parallel groups debug infrastructure including a set of group agents 312 including a root agent, one or more middle agents and one or more leaf agents. In one illustrative embodiment a set of group agents may be arranged in a hierarchical tree structure comprising parent and child relationships.

Messaging component 304 may provide a communications capability for the exchange of messages between the root agent, one or more middle agents and one or more leaf agents and grouping user interface 310. Messages may include requests, responses and events, which flow among group agents 312 according to, required routing destinations or targets.

Grouping queries 306 may provide a capability to have stored queries ready for use repeatedly as needed. Examples include queries having all information predetermined and completed as well as queries requiring a specific input such as a condition element, which varies among a set of selectable values, for example a logical operator between two conditions.

Grouping conditions 308 may provide a capability for a user to define selection or search criteria for use in a query. For example, conditions may define applicable contexts from which a context is selected. In another example, the conditions may be expressions or phrases from which a query is built using combinations of conditions. For example, queries may be constructed using structured query language (SQL) enabling use of typically available query conventions and processing capabilities.

Grouping user interface 310 may provide a top-level interface for the operation of grouping system 300. Grouping user interface 310 may hide the lower layers of grouping system 300 from users providing an interactive capability. Communication with a user may be performed from a user side of the user interface while operations of grouping system 300 using messaging component 304 may flow messages between the user interface and the various agents of grouping system 300.

Group agents 312 may provide a capability of operation management within grouping system 300. As previously stated, in some embodiments, three possible types of agents may be created during the synthesizing of a group within the context of grouping system 300. The highest level of the agent hierarchy may be a root agent, which may be responsible for aggregating information from lower levels of the hierarchy for presentation to grouping user interface 310. Middle agents may collect information and may aggregate information from subordinate middle agents and may form respective associated leaf agents. Leaf agents may interact with application layer elements. For example a leaf agent may be a debug engine instance, handling a number of execution contexts. Requests sent down from grouping user interface 310 may be passed down to various leaf agents routed selectively through the root and middle agents.

Grouping set operations 314 may provide a capability of computing set theory operations on existing groups of entities to form new groups. For example, a union or intersect operation may be selected from a set of possible operations comprising grouping set operations 314.

Figure 4:
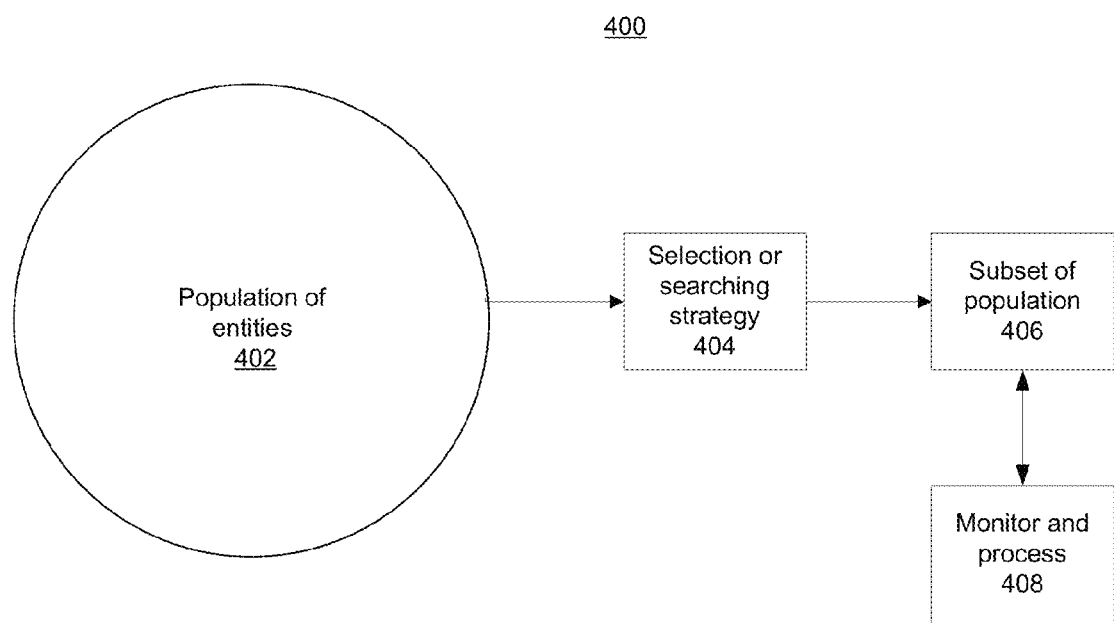
FIG. 4 is a block diagram of overview of a grouping process, in accordance with various embodiments of the disclosure.

With reference to FIG. 4, a block diagram illustrating an overview of a grouping process, in accordance with various embodiments of the disclosure is presented. Overview 400 is an example of a process using grouping system 300 of FIG. 3.

The population of entities 402 may be the data input used in the process. Various combinations of operations of selection or searching strategy 404 may be applied to population of entities 402 yielding an output including subset of population 406 to form a grouping of entities. Subset of population 406 may be further processed in an iterative manner using operations of selection or searching strategy 404 on the grouping of entities. Further processing may provide a smaller size result set grouping of entities. Monitor and process 408, in one example, may include a debug operation. For example, monitor and process 408 may be specified to determine when a threshold of a specified execution context is reached and triggers performance of a detailed examination of a grouping representative of the specified execution context.

Overview 400 illustrates an example operation upon the entities and associated data by treating the entities and associated data as a population. Through an iterative process, the population may be thus sub-divided into groups based upon quantifiable and identifiable properties of entities of the population. In turn, each new group can be operated upon to further sub-divide the group into new groups.

With respect to a process of debugging in the example, attempting to identify and isolate a fault in the execution of an application, when the problem is widespread a large number of the execution contexts may exhibit a bug. However when the problem is more isolated locating a specific thread may be necessary using iterative processing thereby reducing the number of members in the group.

Overview 400 illustrates a framework (mechanism) that can be utilized by several strategies in a process of problem determination or isolation. Selection or searching strategies 404 may include, but are not limited to divide and conquer, odd man out, and outliers. Overview 400 is an example of an efficient mechanism providing a capability for locating an execution context causing a problem. One consideration may include the scope of the problem. The scope of the problem may be widespread or isolated. When the scope is widespread locating an execution context exhibiting the problem may typically not be difficult. However when the scope of the problem is isolated, locating an execution context that exhibits the problem (odd man out) may be required first.

Overview 400 is an example of a highly scalable group forming mechanism capable of operating on a large distributed population without the requirement for enumeration using grouping system 300 of FIG. 3. A group consisting of all members of the population, also known as Group All, may be formed when a communication infrastructure is established with the membership. New groups may be synthesized by sending a query message to an existing group such as during selection or searching strategy 404. Each member of the existing group may evaluate the query. A member may join one or more new groups as a result of the query evaluation.

The forming mechanism described may be scalable because there may not be a centralized list of the members of the group to create and maintain. A member may simply note that it is a member of the group, and may send a message that may cause the membership of the group to be incremented by one. At some later time, when the current condition for membership is no longer valid, the member can leave the group by sending a leave message that may cause the membership count to be decremented by one. The join and leave messaging may be asynchronous. The communication infrastructure accordingly may provide accurate instantaneous membership counts.

The grouping framework may enable many variations of selection or searching strategy 404 that can be utilized (perhaps in combination) to isolate and correlate characteristics of population of entities 402 (execution contexts). For example, when trying to find a needle in a haystack it may be desirable not to be distracted by the hay. Using this analogy the haystack may be an extremely large number of execution contexts comprising a parallel application, the hay may be the state and data associated with the execution contexts and the needle may be the root cause of a bug that may be preventing the application from executing as desired. The grouping framework illustrated in overview 400 may provide an efficient and scalable mechanism for sifting through the hay to isolate the needles.

Some examples of operations of selection or searching strategy 404 may include operations referenced as odd man out, outliers and divide and conquer. In an example using an odd man out strategy, when a small but random group of execution contexts fail to reach a barrier, causing an application to hang, a query such as "Is this context blocked at a barrier?" can be used. This query, when processed, may divide the population into two groups; those execution contexts that are blocked, and those execution contexts that are not. The group of execution contexts that are not blocked may accordingly be a group of interest.

In an example using an outliers strategy, assume a problem involves a distributed set of data, rather than a state of the execution contexts. In this example the size of the dataset may typically be large and measured in gigabytes or even petabytes. When more extreme members of the data set are of interest, a strategy to form groups by sending a data query to all members to retrieve a maximum and a minimum local data values may be used. The query results may be aggregated to obtain a maximum and a minimum value of the data in the distributed set. Groups may be formed by a query of "does this node have data within a specified subsection of the range of values?"

In a further example using a divide and conquer strategy, assume a characteristic, which makes the odd man out odd, may be unknown. The population may require investigation to determine what is odd, as in the anomaly. A reasonable strategy may sub-divide the population based upon properties of that population. For example, a human population may be sub-divided by sex into males and females. The particular simple categorization may unlikely be sufficient to isolate the odd man. The population may be further subdivided, or one of the sub-groups (say males), by other characteristics of the population in an attempt to find the odd man. A next step may establish the intersection of two or more sub-groups to form new sub-groups. The process of introducing new categorizations of the population or a set of sub-groups may be iterated until such time that the membership in a group becomes sufficiently small examination of individual members is possible.

In another example, a set of useful pre-defined groupings may be provided. On startup, a set of general predefined groups can be created, and queries may be sent out. For example, the predefined groups may define contexts that are running, blocked, trapped, terminated, or stopped. The set of general predefined groups may enable identification and interaction with groups in any specific state easier.

Real-time parallel application monitoring and notification may be provided in another example. A debugger can notify a user or perform debugger actions when groups become interesting, based upon cardinality of a group reaching a predetermined or heuristically determined threshold. For example, when a number of blocked execution contexts reach a certain percentage of a number of running execution contexts, the debugger may notify the user and may suggest application performance may be sub optimal.

Tracking group membership over time may be another example in which a new group may be formed to reflect the membership of a group at a specific point in time. Periodic sampling may produce a set of new groups containing a history of membership and can be further queried for patterns.

It may be noted that group membership formed using embodiments of the grouping framework may be anonymous. Individual members of a group may contain the group membership information. There may not be a "master list" of group members available to the end user when using embodiments of the disclosed grouping framework. The absence of such a list may have potential for applications dealing with personal information, which may require no master list of group members be available to comply with privacy requirements. However a master list can may be created using a query with the list results saved whenever desired but creating and maintaining such a list is may not be required. Processing and maintenance overhead may be incurred when creating and saving the generated list, which may be avoided by using the disclosed process.

Illustrative embodiments of the grouping system may provide a capability for a highly scalable grouping mechanism to synthesize and operate upon a virtually limitless set of groups applied to a large set of entities (population) in a distributed environment. The grouping system as in the illustrative embodiments may comprise attributes including, every member of the population is a member of Group ALL referenced as $GROUP_{all}$. A group may be a unique numerical identifier, which may have only two properties available to an observer; cardinality (the number of members in the group) and a single member representative identifier. The utilization of a group representative may be an optimization.

There may not be an explicit enumeration of the membership however. Addressable groups may come into existence without a requirement for membership enumeration. This may also imply the identity of individual members may not be explicitly known. The formation of a new group may not require the enumeration of its members.

Sending a message to an existing target group referenced as $GROUP_{target}$ may form new groups. The message may define one or more groups and the criteria for joining one or more of those groups using a process called group synthesis. The acceptance criterion for joining a group may also be known as a query. A group with no members may consume few resources. New groups can be reserved, in large sequential blocks as desired, by an observer; possibly on behalf of a member of an existing group. The number of reserved groups may be unrestricted. A bottom-up mechanism may enable individuals to initiate a group reservation and mapping.

A simple event messaging mechanism may enable individuals to join a group by incrementing a membership count or to leave the group by decrementing the membership count. Group membership location (routing information) may be encoded in the infrastructure that interconnects the observer via a user interface to the population. When the infrastructure is a tree hierarchy then each sub-tree may encode the group membership of respective direct descendants.

Figure 5:
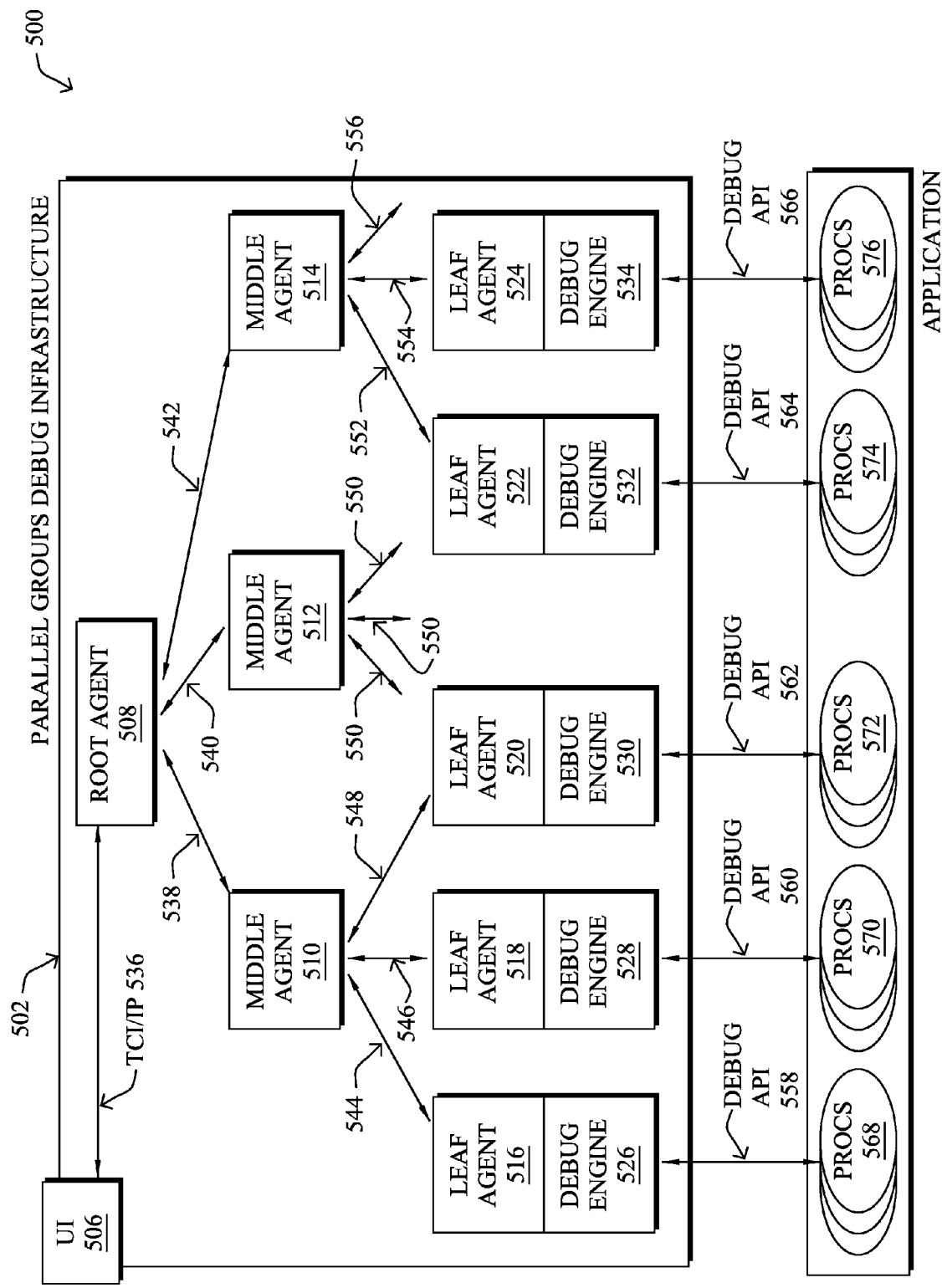
FIG. 5 is a block diagram of a grouping system infrastructure, in accordance with various embodiments of the disclosure.

With reference to FIG. 5, a block diagram of an example of a grouping system infrastructure, in accordance with various embodiments of the disclosure is presented. Grouping system infrastructure 500 may be an example of an infrastructure representative of grouping system 300 of FIG. 3 in a further example using a debug scenario. Grouping system infrastructure 500 may also be referred to as a parallel groups debug infrastructure apparatus.

Grouping infrastructure 502 illustrates a graphical user interface (GUI), UI 506 in communication with a set of back-end debug engines comprising debug engine 526, debug engine 528, debug engine 530, debug engine 532 and debug engine 534 attached to processes 568, processes 570, processes 572, processes 574, and processes 576 that comprise user application job 504. The UI and the set of debug engines may be interconnected through debug agents arranged in a tree hierarchy. The tree may include root agent 508, zero or more levels of middle agents such as middle agent 510, middle agent 512 and middle agent 514 and a set of leaf agents comprising leaf agent 516, leaf agent 518, leaf agent 520, leaf agent 522, and leaf agent 524.

Root agent 508 may communicate directly with UI 506 on one side through link 536, and with the set of leaf agents, either directly or indirectly through levels of the set of middle agents on the other side using link 538, link 540, and link 542 and a set of links such as link 540, link 546, and link 548, a set of links 550 and a set of links comprising link 552, link 554, and link 556. There may be one leaf agent/debug engine per operating system image (OSI) with the respective debug engine attached directly to one or more associated application processes, such as processes 568, processes 570, processes 572, processes 574, and processes 576 executing on that operating system image using a set of debug application program interfaces (API) such as debug API 558, debug API 560 debug API 562 debug API 564 and debug API 566. Each leaf agent may be co-resident with a respective debug engine in a same process.

Each group may be identified by a unique number; known as a Group ID indicated as $GROUP_{ID}$. For continuity UI 506 may assume responsibility of assigning group identifiers (ID). When a new group ID or a set of group IDs is required UI 506 may reserve the identifiers. The reservation process may be simple because the only requirement may be that the Group ID is unique.

For certain examples of processing reserving a range of group IDs treated as a set or distribution may be useful. For example, when UI 506 tracks the line location of every suspended thread. When a new source file is visited for the first time by an execution thread a set of group IDs may be reserved mapping to corresponding lines in the source file. For a ten thousand-line source file, ten thousand group IDs may be reserved. The group ID of a given line may equal the line 1 group ID+line number−1. When a group set is reserved, the Group IDs may be consecutive enabling references using a base Group ID and one or more indices. A set of group IDs may be referred to as a Group Array.

The term reserve is used to illustrate that a Group ID may not be a group per se until there are members associated. During a given debug session a large number of these reservations may typically not result in an addressable group because no members will join the corresponding group. Accordingly a very large number of potential groups can be reserved with virtually no overhead.

A set of group IDs (Group IDs 1 through n) corresponding to the leaf agents may be reserved where n is the number of leaf agents. By default, the parallel groups debug infrastructure ensures each leaf agent may be a member of a respective corresponding group. Every execution context may be a member of $GROUP_{ALL}$. $GROUP_{ALL}$ corresponds to $Group_0$.

All group related communications may be carried out using one of three message types including requests, responses and events. A request message may originate at UI 506, or alternatively at any parent agent such as root agent 508, middle agent 510, middle agent 512 and middle agent 514, and may be sent down towards leaf agents such as leaf agent 516, leaf agent 518, leaf agent 520, leaf agent 522, and leaf agent 524. A request message may be directed to any existing group. Request messages may be addressed using an embedded target group identifier. The parallel groups debug infrastructure agents may handle the routing of a message to members of a group. The routing data may be acquired as a side effect of the group synthesis mechanism. Each agent in the parallel groups debug infrastructure may maintain a mapping of respective direct decedents that have members in the target group. All subsequent groups may be established as a side effect of request messages sent to an existing group.

For efficiency, most request messages typically may not require an explicit response. For request messages that do require a response, response messages may be used. These response messages may be synchronous meaning every member of the target group may be required to provide a response. The parallel groups debug infrastructure agents may aggregate individual response messages as the responses travel upstream toward root agent 508. A single aggregated response message may be sent to UI 506.

Events may be unsolicited, asynchronous messages may be sent upstream towards UI 506 as a result of group state transitions that may occur at any time. The specific triggers for these events may be implementation dependent. Event messages may be fundamental to the group synthesis process.

The mechanism used to form new groups may be called group synthesis. During initialization, the default group, $GROUP_{ALL}$, may be formed. By definition, every member of the population may be a member of this group. Over time, any changes in the population may be reflected in the membership of $GROUP_{ALL}$. The cardinality of a group may be defined to be the number of members in that group. In an illustrative embodiment the cardinality of $GROUP_{ALL}$ is a number of execution contexts within the entire application. Join and leave event messages may propagate the membership information upstream through the parallel groups debug infrastructure to root agent 508, through middle agent 510, middle agent 512 and middle agent 514, from the leaf agents such as leaf agent 516, leaf agent 518, leaf agent 520, leaf agent 522, and leaf agent 524 to UI 506 using respective links as previously described.

During join and leave event message processing that may occur at an agent of the parallel groups debug infrastructure, a group representative may be selected on a per group basis. The selection may be made from incoming messages arriving from direct descendants of the agent. As a result, UI 506 may have knowledge of the number of members in a group as well as the identity of one group member, called a group representative. UI 506 may elect to send request messages directly to the group representative. When a current group representative leaves the group a new group representative may be selected from the remaining members as a replacement.

One of the techniques available to synthesize new groups may include combining of existing groups using set theory operations such as union, intersect, and other operations. These operations may be performed at a lower level of the hierarchy in the leaf agents and are therefore distributed and scalable.

Where applicable, grouping system infrastructure 500 may form new group arrays using an overlay technique. A new range of group IDs may be reserved to match the size of an existing group array. An array map request message may be sent to a target group, $GROUP_{target}$ associating the new group array with an existing group array and may be qualified by membership in $GROUP_{target}$. Execution threads may join an appropriate group within the group array when the execution thread is also a member of $GROUP_{target}$. This overlay technique may leverage the fact that group set reservation may be an inexpensive and efficient process. At a leaf agent, subsequent membership transitions on $GROUP_{target}$ may be reflected in the group array membership through join and leave events on the group array.

An example of this technique may include an ability to overlay location information onto a new target group such as $GROUP_{new}$. The default location group arrays are related to $GROUP_{ALL}$. An illustrative embodiment uses group arrays for debug state (suspended, running, and other states), function location, line location, and stacks. Any new group may, by definition, be a subset of $GROUP_{ALL}$. UI 506 may reserve group arrays for $GROUP_{new}$ to overlay onto existing group arrays associated with $GROUP_{ALL}$. An array map request message may communicate the new group array mappings onto $GROUP_{new}$. Join events may occur to populate the new group array qualified by existing membership in the appropriate target group relative group.

Group membership as previously disclosed may be dynamic and capable of changing at any time during the processing of in-flight synchronous request and response messages. The parallel groups debug infrastructure agents may be required to maintain consistency in the group membership and deal with outstanding requests affected by target group membership changes. Propagation delays incurred by messages may make it possible for a request message sent from UI 506 to not arrive before all members have left the target group. Therefore, it is possible that the parallel groups debug infrastructure response to a request from UI 506 will be empty. The parallel groups debug infrastructure may also attempt to include latecomers, those members who join while the response set is being formed, in the response set.

For asynchronous request messages a more relaxed approach may be employed. This type of request message may not have an explicit response. UI 506 may receive join and leave event messages as a result of the request. By associating a group array with the request, a target group can be efficiently subdivided. For example, a debug state request may use this type of association (for example the states include running, stopped, terminated, blocked, and other typical states descriptive of a typical operational status).

With reference to downstream request message processing, assume all agents may participate in the downstream propagation of messages sent from UI 506 to the leaf agents comprising leaf agent 516, leaf agent 518, leaf agent 520, leaf agent 522, and leaf agent 524 according to target group membership. When a request message $REQ_{cmd}$ arrives at a non-leaf agent, such as middle agent 510, the middle agent may determine whether the middle agent has any direct children with membership in the target group $GROUP_{target}$. An asynchronous request may be ignored when the agent has no child agents with membership in $GROUP_{target}$. For a synchronous request the agent may generate an empty response message $REQ_{cmd}$. Otherwise, the agent may send $REQ_{cmd}$ to the set of child agents who are known to have members in $GROUP_{target}$. In an alternative approach the middle agents may broadcast the message to all children and the leaf agents may either provide a response or ignore the request. For a synchronous $REQ_{cmd}$ the agent may maintain a record of the set of outstanding $RSP_{cmd}$ expected from respective child agents. The agent may then wait for other messages to arrive including the response messages for $REQ_{cmd}$.

Group membership can change as result of asynchronous events and state transitions occurring within a debug session. The parallel groups debug infrastructure agents may maintain message consistency in the presence of these changes in membership. When the child agent membership in $GROUP_{target}$ changes while at least one $RSP_{cmd}$ is still outstanding, the agent may adjust the $RSP_{cmd}$ set accordingly. When a new child agent is added to $GROUP_{target}$, then $REQ_{cmd}$ may be sent to the new child agent and $RSP_{cmd}$ may be added to the expected set. When a child agent leaves the $GROUP_{target}$, the corresponding $RSP_{cmd}$, whether received or not, may be removed from the $RSP_{cmd}$ set. A timeout mechanism may be employed to enable recovery from unresponsive child agents.

For synchronous request messages, one Response message $RSP_{cmd}$ may be expected from each child agent, such as leaf agent 516, participating in a request message $REQ_{cmd}$. When an $RSP_{cmd}$ is received, the agent may verify the $RSP_{cmd}$ is expected. When no longer expected the $RSP_{cmd}$ may be discarded otherwise, $RSP_{cmd}$ may be added to the response set. When all expected $RSP_{cmd}$ have been received, the agent may process the response set, may build an aggregated response message $RSP_{agg}$ and may send the aggregated message upstream to the parent. When not all expected $RSP_{cmd}$ are received, a timeout may occur and the agent may decide to attempt recovery by completing the response set. Root agent 508 may perform a final aggregation and sends a completed response to UI 506.

A primary responsibility of the parallel groups debug infrastructure may be to combine upstream response messages and event messages into a smaller set of messages. The process of aggregation and filtering may reduce the message-processing load on UI 506. For synchronous response messages a single resultant response message may be passed from root agent 508 to UI 506. For event messages, the arrival of incoming event messages and departure of outgoing event messages may affect the ability of the agent to aggregate and filter. There may be tradeoffs with respect to the timely upstream delivery of event messages versus the opportunities to combine or eliminate event messages. In some embodiments, the longer an agent waits before forwarding event messages, the more aggregation and filtering may occur however, when the propagation delay is too long the interactive response observed by a user may be affected. Without aggregation and filtering such as a case of immediate forwarding, the network bandwidth requirements and other system overhead may increase with a potential bottleneck forming due to population increases.

Membership of a given group may correspond to a measurable or detectable property or characteristic of the execution context. An internal event may include any execution context related activity having a potential to change the membership within the existing groups. When a request message $REQ_{cmd}$ arrives from a parent agent, membership in the target group $GROUP_{target}$ at the leaf agent may be queried. When there are no members in $GROUP_{target}$ $REQ_{cmd}$ may be ignored otherwise, $REQ_{cmd}$ may be processed. The operations performed for $REQ_{cmd}$ may be request command specific. When $REQ_{cmd}$ is synchronous, upon completion, a response message $RSP_{cmd}$ may be sent to the parent agent. For asynchronous requests, execution context events posted by a debug engine may cause the leaf agent to change the local membership of groups. Changes to the local group membership may result in a join event $EVENT_{join}$ and leave event $EVENT_{leave}$ messages queued for sending to the parent. The leaf agent may elect to delay certain event messages to take advantage of local aggregation opportunities.

Figures 6, 7:
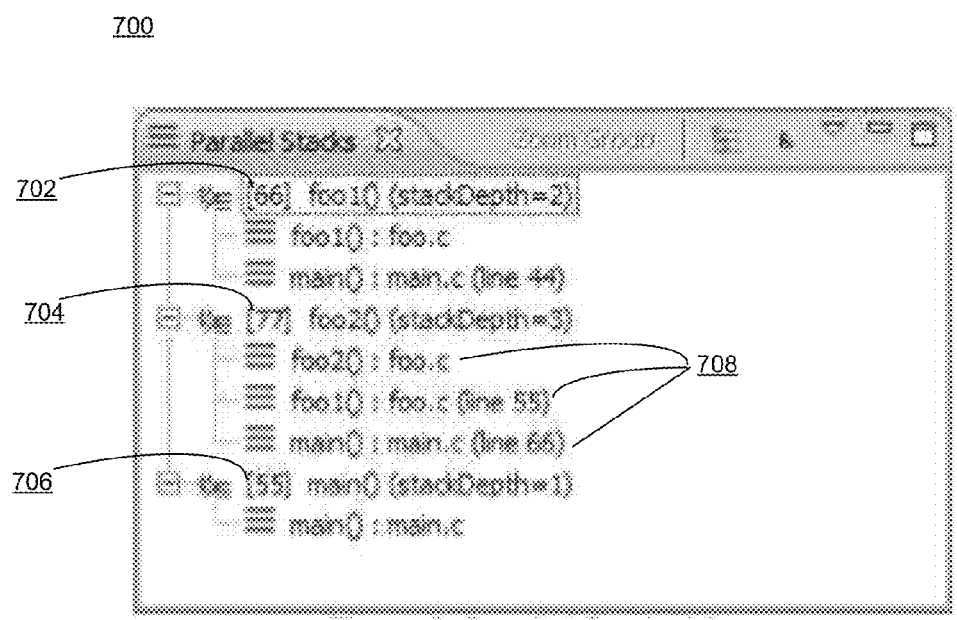
FIG. 6 is a block diagram of a debug state request message format, in accordance with various embodiments of the disclosure.
FIG. 7 is a graphic representation of a user interface portion of a parallel stacks view, in accordance with various embodiments of the disclosure.

With reference to FIG. 6, a block diagram of a debug state request message format, in accordance with various embodiments of the disclosure is presented. Message format 600 may be an example of debug state request message format used with grouping system 300 of FIG. 3 and grouping system infrastructure 500 of FIG. 5 in a further example using a debug scenario.

Use cases illustrate the utility and versatility of the parallel groups debug infrastructure previously described. A debug state use case illustrates how groups may be used by a parallel debugger to provide a user interface such as UI 506 of grouping system infrastructure 500 of FIG. 5 with dynamic information for the debug state of execution threads. During a typical debug session, a majority of execution threads may reside in either a running state or a suspended state, although there can be any number of other valid debug states such as terminated, in kernel, and signaled to name a few.

In an illustrative example, UI 506 may reserve a set of consecutive group IDs that map to allowable debug states. For this example, 16 groups IDs may be set aside. UI 506 may send a debug state request message to $Group_{ALL}$. This message may not require an explicit response. An example message format is shown as message format 600.

$GROUP_{target}$ 602 may identify a group ID to which the message may be delivered, in this example a value of 0 is used. Message ID 604 may be a unique value, such as 554, distinguishing this message from other active request messages. The message ID may be applicable to only requests having a need for explicit responses. Request CMD 606 may be a value representative of a type of request message, such as debug_state. Datalen 608 may indicate a number of bytes comprising the message, for example 8 bytes. Arg0 610 may represent a group ID base (10000), which may be the first group ID used when mapping the debug states to a group. Arg1 612 may represent a group count, which may be the number of groups available for membership, in this example a value of 16. There may be one group for each possible debug state.

In this example the possible debug states may be suspended, running, signaled, detached, terminated, and others. For this request, the mapping from debug state to Group ID may be suspended→10000, running→10000+1, signaled→10000+2, detached→10000+3, and so on for other debug states.

At each leaf agent, the debug state of all threads in $GROUP_{ALL}$ may be considered. For every thread that is suspended, join the group identified as 10000. For every thread that is running, join the group 10001. For every thread that is signaled, join the group 10003 and so on.

For each non-zero group, the leaf agent may queue an event message $EVENT_{join}$ to a respective parent. The event messages may be bundled into a single packet for transmission to the parent. At each parent agent, the message may be unpacked and processed. Membership counts associated with each group may be updated and queue $EVENT_{join}$ messages to a respective parent may be performed. Aggregate $EVENT_{join}$ messages for the same group may occur. Event messages may be bundled and sent to a respective parent.

At the root agent, the message may be unpacked and processed. Membership counts associated with each group may be updated, $EVENT_{join}$ messages may be queued to the user interface and event messages may be bundled and sent to the user interface.

In a use case for Set Parallel Breakpoint, the user interface may provide several interactive means to enable a user to place a parallel breakpoint within the execution code. The user interface may send a set parallel breakpoint request message $REQ_{bkpt}$ to the selected target group $GROUP_{target}$. Each leaf agent, with members in $GROUP_{target}$, may coordinate with a respective debug engine to set the breakpoint for corresponding execution contexts (threads). The set parallel breakpoint request may not have an explicit response.

The leaf agents may communicate the state of the breakpoint using asynchronous join events applied to a group ID array that corresponds to the following; hit, installed, deferred, enabled, problem. The user interface may use the membership of these groups to evaluate the result of the set parallel breakpoint request on an ongoing basis. When there is a problem setting the breakpoint on a subset of threads, the threads may be identified by membership in the problem group. The user interface can then direct the user to operate on the problem group to help determine why the operation failed.

In the example of Parallel Breakpoint Hit assume the user interface, under direction of the user, has configured a parallel breakpoint using a $REQ_{bkpt}$ sent to $GROUP_{target}$. In this example, every leaf agent with members in the breakpoint installed and enabled groups may have the potential to hit the breakpoint. When a thread of execution encounters a breakpoint, the debug engine may post an engine breakpoint event to the leaf agent.

The leaf agent may update the membership of the hit breakpoint group to reflect the number of execution threads at the breakpoint. The leaf agent may choose to defer the passing of the join event message to the parent agent while waiting for other execution threads to arrive at the breakpoint trap. The leaf agent may send the $EVENT_{join}$ to the parent The parent agent may defer passing the $EVENT_{join}$ upstream immediately while waiting for other child agents to respond. The parent agent may send a, possibly aggregated, $EVENT_{join}$ upstream to a respective parent.

The root agent may send a possibly aggregated, $EVENT_{join}$ to the user interface. The user interface may update the debug view to indicate a number of execution threads that have hit the breakpoint.

In another use case example, a thread location (file/function/line) case may illustrate how leaf agents can initiate formation of groups. Assume at least one execution thread may stop at a new location that has not been visited by any other thread within the application.

A leaf agent may examine a stop address of an execution thread to determine the source file, source function and source line. This information may be combined with additional details, such as module and compile unit, and may then be encoded into a unique location signature. The first time the location is visited, there may not be a group associated with the signature.

The leaf agent may generate a map location event message $EVENT_{map}[location]$, which may contain the location signature, and may send the message upstream to a respective parent agent. In turn, the parent agent may know the groups associated with this location. When known the parent may reply to the child agent with a define map request message $REQ_{define}[location]$. Otherwise the parent agent may record the signature of the location for future reference, and may pass the $EVENT_{map}[location]$ upstream. A subsequent $EVENT_{map}[location]$, for the given location, from another child agent may be filtered and may not generate an upstream event.

Assuming the root agent cannot provide the mapping, one $EVENT_{map}[location]$ per location may be sent to the user interface for processing. Upon receiving the $EVENT_{map}[location]$, the user interface may map the function location in the signature to a new group ID, may generate and send $REQ_{define}[location]$ to $GROUP_{ALL}$ and may obtain further details about the location (signature) by sending a location details request message $REQ_{details}[location]$ to the group representative.

The leaf agent associated with the group representative may process the $REQ_{details}[location]$, may examine the execution thread location and may build a location details response message $RSP_{details}[location]$ containing a source file name, a function entry name, number of lines in the source file and other location details as needed. The leaf agent associated with the group representative may send the resulting $RSP_{details}[location]$ directly to the root agent.

The root agent may pass $EVENT_{details}[location]$ to the user interface and the user interface may process $EVENT_{details}[location]$. The details may be used to decorate the function location display objects, to reserve a group ID array that maps to the source file lines and to send $REQ_{define}[lines]$, a request message to define the source file line mapping to $GROUP_{ALL}$. For each leaf agent with threads stopped on a source file line defined by $REQ_{define}[lines]$ may join the appropriate group that corresponds to the source line location and may send one event message $EVENT_{join}$ for each non-zero source line location group.

Upstream event messages may be aggregated and passed to the parent agent. The root agent may perform a final aggregation and may send an event message to the user interface. The user interface may process each $EVENT_{join}$ and may update the line location display objects with the membership counts.

With reference to FIG. 7, a graphic representation of a user interface portion of a parallel stacks view, in accordance with various embodiments of the disclosure is presented. View 700 is an example of a view representing parallel stacks processed using grouping system 300 of FIG. 3 and grouping system infrastructure 500 of FIG. 5 in a further example using a debug scenario.

In another use case, parallel stack traces may be an example of an approach analogous to a Thread Location (File/Function/Line) use case used to provide the user interface with the complete set of stack traces of the execution threads. When a thread stops at a location, a stack signature may be calculated. When the stack signature maps to a known group ID, then the thread may join that group, such as group 702, group 704 and group 706 and an $EVENT_{join}$ may be sent. Otherwise, the leaf agent may send a map stack signature event message $EVENT_{map}[stack]$ to a respective parent. Then a process similar to the process used for Thread Location (File/Function/Line) groups may be followed. Included in this process may be efficient use of messaging bandwidth with respect to stack details. Only a single copy of the stack frames needs to be transferred from the parallel groups debug infrastructure to the user interface. The distribution of threads over the active set of stack traces, such as the set of stack traces of group 702, group 704 and group 706, may be built using the join event mechanism for group 704. The user interface may use the stack trace group memberships and the corresponding stack frame details, such as the set of stack frames 708, to build a parallel stack view or a call graph. Each stack trace group may also provide an indication of the number of members, and the stack frame depth, also displayed in the view for a respective group.

Over time, as the debug session continues, the number of EVENT$_{map}$[stack] messages and REQ$_{details}$ [location]/RSP$_{details}$ [location] messages and REQ$_{define}$[lines] messages, may have the potential to go to zero, depending upon the stopping pattern of the threads. As a result, under normal conditions, the overhead of building parallel stack view 700 and the call graph view may be low.

A further example may provides a variable min/max use case. A basic property of a data distribution may include the range of values expressed as the difference between the maximum value and the minimum value. The range associated with a variable data set can be determined through a custom request message REQ$_{minmax}$. Leaf agents may determine the minimum and maximum values of a variable within execution contexts of the target group. Each leaf agent may send a single response message RSP$_{minmax}$ with the local min/max values to a respective parent. The RSP$_{minmax}$ set at a parent may be aggregated into a single min/max pair being sent upstream. The root agent may send the resultant RSP$_{minmax}$ to the user interface. As a side effect of the REQ$_{minmax}$/RSP$_{minmax}$ two groups may be established. One group, GROUP$_{min}$, may be associated with the execution thread(s) where the minimum value resides, and a corresponding group, GROUP$_{max}$, may be associated with the execution thread(s) where the maximum value resides.

Figure 8:
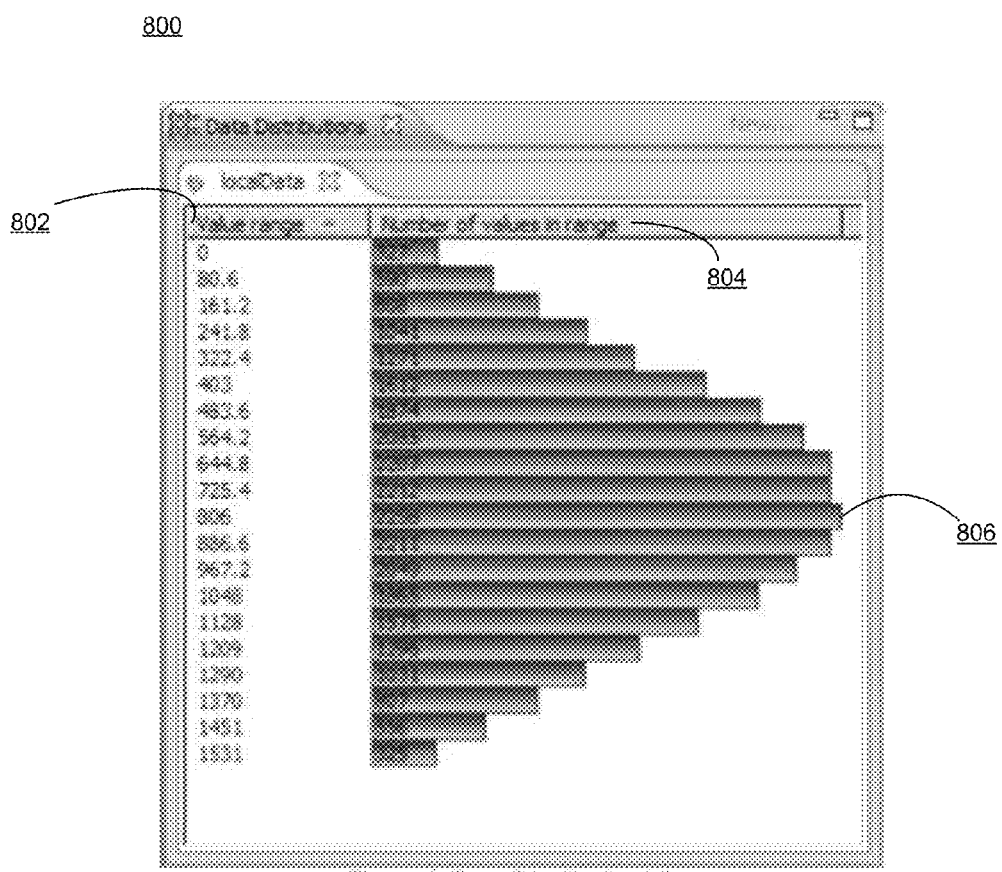
FIG. 8 is a graphic representation of a user interface portion of a data distribution view, in accordance with various embodiments of the disclosure.

With reference to FIG. 8, a graphic representation of a user interface portion of a data distribution view, in accordance with various embodiments of the disclosure is presented. View 800 may be an example of a view representing a data distribution processed using grouping system 300 of FIG. 3 and grouping system infrastructure 500 of FIG. 5 in a further example using a debug scenario.

In a use case example of data distribution, parallel applications may operate on data distributed across the application with each execution context normally having a portion of the data local. This use case may demonstrate the versatility of grouping system 300 of FIG. 3 as applied to data. The following procedure may be applicable to arrays as well as scalars.

The user interface may solicit the data value range from the user or use a request message REQ$_{minmax}$ to establish a range for the data distribution. The user interface may divide the range, indicated as value range 802 into N equal sized sub-ranges or buckets. For example, when a minimum=0 and maximum=99 then the user interface may consider a distribution with 10 equal sized buckets plus two out-of-bounds buckets comprising ranges of <0, 0-9, 10-19, 20-29, . . . , 90-99, and >99. A data distribution request message REQ$_{data}$ data may then be sent downstream from the user interface. REQ$_{data}$ may specify the min/max values, the number of buckets and may provide a group array that maps 1-to-1 to the buckets.

At the leaf agents, the data values within each execution context may be examined. For each data value, the corresponding distribution bucket may be determined, the bucket counter, indicated as number of values in range 804, may be incremented, and the corresponding entry in the group array, such as group 806, may be set. With every leaf agent operating simultaneously this process may typically be efficient. The leaf agent may aggregate the bucket weighting result from each execution context into a single bucket set. The leaf agent may also operate on the group array causing the appropriate event messages EVENT$_{join}$ to be built. Significant EVENT$_{join}$ aggregation may occur prior to messages being sent up stream. When all execution contexts have been processed, the leaf agent may generate a response message RSP$_{data}$ and may send the message upstream to the parent agent. In turn, each parent agent may aggregate respective RSP$_{data}$ sets and may pass the result upstream. The root agent may pass the final resulting RSP$_{data}$ to the user interface. The user interface may present the data distribution to the user as in view 800 of FIG. 8. Each bucket may have an associated group GROUP$_{bkt[i]}$, which can be used just like any other group to create a refined data distribution.

Figure 9:
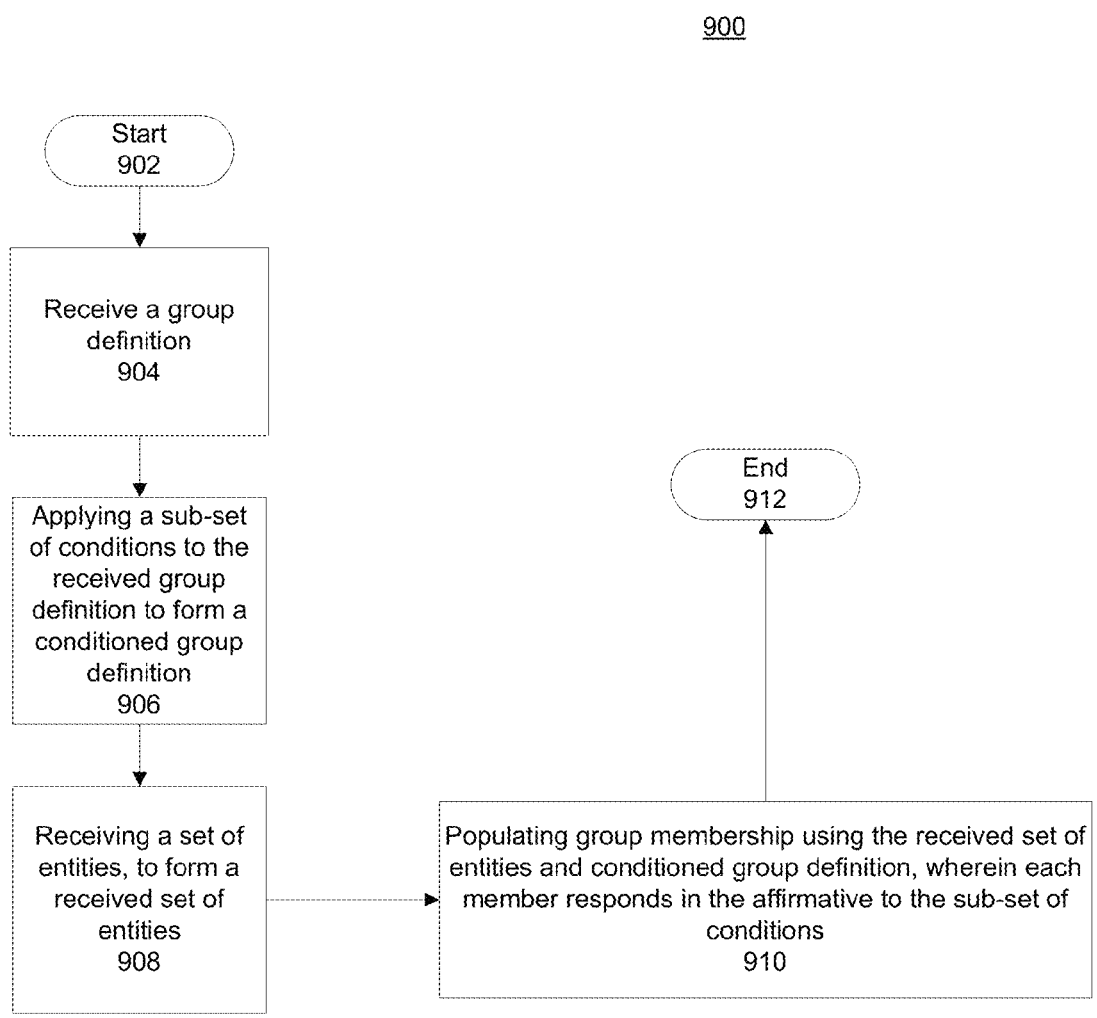
FIG. 9 is a flowchart of a process for group forming, in accordance with various embodiments of the disclosure.

With reference to FIG. 9, a flowchart of a process for group forming, in accordance with various embodiments of the disclosure is presented. Process 900 may be an example of a process of group forming using grouping system 300 of FIG. 3 and grouping system infrastructure 500 of FIG. 5.

Process 900 may begin (step 902) and may receive a group definition (step 904). Process 900 may apply a sub-set of conditions to the received group definition to form a conditioned group definition (step 906). A requester may provide the set of conditions directly in response to a prompt or indirectly as a persisted set of conditions previously stored and the conditions may represent a collection or set of selection or search criteria that may be applied to the previously obtained set of execution contexts. The set of conditions may be previously defined including a set of grouping queries, a set of grouping conditions or a set of group set operations, or combinations thereof. The requester typically may interface with process 900 using a user interface.

The sub-set of conditions may be derived from a set of conditions previously received. A user typically may specify a selected sub-set containing one or more conditions from the set of conditions received. Conditions may be specified in combinations as well as individually.

Process 900 may receive a set of entities to form a received set of entities (step 908). For example, entities may be execution contexts. Execution contexts may own the various states and data of a respective executing application of interest to a requester for which information is desired.

Process 900 may populate group membership using the received set of entities; wherein each member may respond in the affirmative to the subset of conditions (step 910). Populating membership may apply a result of the selected sub-set of conditions on the received group definition in the form of a conditioned group definition to the received set of entities (execution contexts). For example, applying the selected subset of conditions as a conditioned group definition to the received set of execution contexts may process the received set of execution contexts using the previously described parallel groups debug infrastructure through a set of middle agents and leaf agents.

Process 900 may terminate thereafter (step 912). The set of groups formed may be dependent upon the application of the subs-set of conditions to the population of the received set of entities (execution contexts) representative of an executing software application of interest. Each group formed may have a unique group identifier to distinguish a group from all other groups so formed.

Forming a group, contrary to prior solution attempts, may not require enumeration of the members of the group. In some embodiments, a list of group members may not be maintained or specified as a selection criterion. A query may be sent to each leaf agent and may cause the leaf agent to respond indicating the number of execution contexts handled by the leaf agent, which comply with the condition and are members of the group. Accordingly the leaf agent may maintain membership dynamically responsive to conditions applied.

Reporting of membership may further be managed using message processing within the infrastructure to percolate results upward to a root level for return to a requester using a user interface. In an alternative implementation a result may be returned to a tool such as a debug tool for further action.

Forming a set of groups may further include initiating a debug action for a selected group or the set of groups using characteristics of the selected group or set of groups. Forming a group may also be used to track group membership over time, wherein the groups formed may provide snapshots of group membership at specific points in time.

When groups are formed, a count of members in respective groups may be maintained in the associated agents. For example, a leaf agent may handle ten execution contexts, five of which are members of a group. It may contribute a count of five to an associated parent. Should that parent have nine other leaf agents, each of which have only one execution context that is a member of the group, the parent may have a total count of fourteen (5+9). Aggregation may be performed at each higher level of a hierarchical data structure of the previously described parallel groups debug infrastructure and may provide a summary of lower level information passed upstream, thereby reducing traffic through the infrastructure.

Forming of groups may also include addition and deletion of members due to the self-defining dynamic nature of the groups. For example, when adding a member to a group, a join message may be issued from an agent to a respective parent. The parent may increment a group membership counts by one. In a similar manner when a member leaves a group, a leave message may be sent to a respective parent. The respective parent may decrement a group membership counts by one. The join and leave messaging may be asynchronous. The communication mechanism of the infrastructure may enable real time membership counts responsive to the dynamic nature of groups reflecting a current status of the execution contexts.

Forming of groups may also enable use of previously formed groups as target groups. For example, iterating though a set of conditions applied to a previously formed group as a target group may enable a divide and conquer strategy to focus on a particular set of characteristics of a group or set of groups. Using the debug example, group forming may enable a debug operation to examine an arbitrary member of a group in detail.

Thus is presented in an illustrative embodiment, a computer-implemented process for scalable group synthesis that may receive a group definition, may apply a sub-set of conditions to the group definition to form a conditioned group definition, may receive a set of entities and may populate group membership using the received set of entities and conditioned group definition, wherein each member may respond in the affirmative to the sub-set of conditions.

Receiving a group definition may further comprise receiving an existing group definition to form a potential set of members and receiving a set of conditions, which may determine potential membership. Receiving a group definition may also comprise prompting a requester for the group definition and receiving the group definition as well as prompting the requester for a set of conditions and receiving the set of conditions to form a sub-set of conditions for determining potential membership. Applying a sub-set of conditions to the group definition may further comprise adding temporal conditions to the group definition.

The group definition may further comprise a capability enabling group synthesis without requiring explicit evaluation of the conditions at the potential members. A group definition may further comprise an existing pre-defined set of group definitions providing a basis for further group definitions. The group definition may further comprise persisted group definitions or an existing pre-defined set of group definitions providing a basis for further group definitions.

Using the computer-implemented process may enable populating group membership separately from the definition of the group, wherein eliminating a cost of group synthesis during group definition may optimize the group definition. The operation of defining the group may not require the synthesis of the membership of the group; therefore resources may not be unnecessarily expended during group definition.

Populating group membership may further comprise adding a member to a group, wherein an addition may send a join message to a respective parent of the member incrementing a member count by one at the respective parent, wherein the join message may be propagated to the respective parent and wherein the join message may be asynchronous or removing a member from the group, wherein a removal may send a leave message to a respective parent of the member decrementing a member count by one at the respective parent, wherein the leave message may be propagated to the respective parent and wherein the leave message may be asynchronous.

Populating group membership may further comprise filtering of the group definition in an agent infrastructure wherein the group definition may only be forwarded to agents that have potential group members as well as aggregating information representative of an agent at a respective parent of associated agents at each level above the agent in an agent infrastructure, wherein aggregation may occur progressively as information passes upstream. Populating group membership may also comprise continuously evaluating membership at an agent of an entity.

Further populating group membership may comprise forming of a set of group definitions interrelated by time, wherein each group definition in the set of group definitions may be separated by a predetermined time interval to track group membership of a specific group definition over time. The set of group definitions thus formed may create a time sequence of group definitions providing snapshots of membership for a group over a predetermined period of time.

Populating group membership may further include maintaining a count of group membership at each agent and a parent of each agent in the hierarchical infrastructure for all cases. The count maintenance technique may provide a granular capability while also enabling increasing aggregation at each progressively higher level of the hierarchical infrastructure.

Combining the receiving a group definition, the applying a sub-set of conditions to the group definition and the populating group membership into a single message that may be distributed within the agent infrastructure may be an optimization technique to reduce message traffic throughout the previously described infrastructure.

In an alternative illustrative embodiment a computer-implemented process for scalable group synthesis may receive a set of entities to form a received set of entities, may receive a set of conditions, may select a sub-set of conditions from the set of conditions, may apply the selected sub-set of conditions to the received set of entities and may form a set of groups, wherein a group may be formed of members each responsive in the affirmative to the selected sub-set of conditions signifying membership. No enumeration of members may be required because each member may respond individually to a request for information using the set of conditions. A responder, in the form of a leaf agent, on behalf of the execution context, may be self-determining of membership in the group formed.

Selecting a sub-set of conditions from the set of conditions may further comprise prompting a requester for a selection from the set of conditions and receiving the selection from the set of conditions to form the sub-set of conditions, wherein the sub-set of conditions may be a portion of the set of conditions including the set of conditions.

Forming a set of groups may further comprise one of adding a member to a group in the set of groups, wherein an addition may send a join message to a respective parent of the member incrementing a member count by one at the respective parent and removing a member from the group in the set of groups, wherein a removal may send a leave message to a respective parent of the member decrementing a member count by one at the respective parent, and wherein the join message and the leave message may be asynchronous.

The computer-implemented process of forming a set of groups may further comprise forming a set of sub-groups using a previously formed set of groups as a target group; and iteratively applying the set of conditions to the target group to enable a selected selection and search criteria to isolate and correlate characteristics of the received set of entities. Forming a set of groups may further comprise aggregating information representative of an associated entity at a respective parent agent of the associated agent at each level in a hierarchy, wherein aggregation may increase as information passes upstream. Forming a set of groups may further comprise forming a set of groups to track group membership may be a specific group over time and also maintaining a count of group membership at a parent.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for scalable group synthesis, the computer-implemented process comprising:
    receiving, on a processor, a group definition;
    applying, on the processor, a sub-set of conditions to the group definition to form a conditioned group definition;
    receiving, on the processor, a set of entities, wherein the set of entities includes threads of a parallel application; and
    populating, on the processor, group membership of threads using the received set of entities and the conditioned group definition, wherein each member includes at least one thread that responds in the affirmative to the sub-set of conditions,
wherein populating group membership further comprises:
filtering of the group definition in an agent infrastructure wherein the group definition is only forwarded to agents that have potential group members, and
wherein the group definition further comprises: enabling group synthesis without requiring explicit evaluation of the conditions at the potential group members.

2. The computer-implemented process of claim 1 wherein receiving the group definition further comprises:
receiving an existing group definition to form a potential set of members; and
receiving a set of conditions which determine potential membership.

3. The computer-implemented process of claim 1 wherein the populating of group membership is separated from a definition of the group thereby reducing resource required in the absence of members.

4. The computer-implemented process of claim 1 further comprising:
eliminating a cost of group synthesis during group definition by avoidance of performing group synthesis during group definition.

5. The computer-implemented process of claim 1 wherein receiving the group definition further comprises:
prompting a requester for the group definition; and
receiving the group definition.

6. The computer-implemented process of claim 1 wherein applying the sub-set of conditions to the group definition further comprises:
prompting a requester for a set of conditions; and
receiving the set of conditions to form a sub-set of conditions for determining potential membership.

7. The computer-implemented process of claim 1 wherein populating group membership further comprises one of:
adding a member to a group, wherein an addition sends a join message to a respective parent of the member incrementing a member count by one at the respective parent, wherein the join message is propagated to the respective parent and wherein the join message is asynchronous; and
removing a member from the group, wherein a removal sends a leave message to a respective parent of the member decrementing a member count by one at the respective parent, wherein the leave message is propagated to the respective parent and wherein the leave message is asynchronous.

8. The computer-implemented process of claim 1 wherein populating group membership further comprises:
aggregating information representative of an agent at a respective parent of associated agents at each level above the agent in an agent infrastructure, wherein aggregation occurs progressively as information passes upstream.

9. The computer-implemented process of claim 1 wherein populating group membership further comprises:
continuously evaluating membership at an agent of an entity.

10. The computer-implemented process of claim 1 wherein applying the sub-set of conditions to the group definition further comprises:
adding temporal conditions to the group definition.

11. The computer-implemented process of claim 1 wherein populating group membership further comprises:
forming of a set of group definitions interrelated by time, wherein each group definition in the set of group definitions is separated by a predetermined time interval to track group membership of a specific group definition over time.

12. The computer-implemented process of claim 1 wherein the group definition further comprises an existing pre-defined set of group definitions providing a basis for further group definitions.

13. The computer-implemented process of claim 1 wherein the group definition further comprises persisted group definitions.

14. The computer-implemented process of claim 1 wherein populating group membership further comprises:
maintaining a count of group membership at each agent in an infrastructure and a parent of each agent.

15. The computer-implemented process of claim 1 wherein populating group membership further comprises:
combining receiving the group definition, applying the sub-set of conditions to the group definition and populating group membership into a single message that is distributed within the agent infrastructure.

16. A computer program product for scalable group synthesis, the computer program product comprising:
a non-transitory computer readable storage medium having computer executable program code stored thereon, the computer executable program code comprising:
computer executable program code for receiving a group definition;
computer executable program code for applying a sub-set of conditions to the group definition to form a conditioned group definition;
computer executable program code for receiving a set of entities, wherein the set of entities includes threads of a parallel application; and
computer executable program code for populating group membership of threads using the received set of entities and the conditioned group definition, wherein each member includes at least one thread that responds in the affirmative to the sub-set of conditions,
wherein computer executable program code for populating group membership further comprises: computer executable program code for filtering of the group definition in an agent infrastructure wherein the group definition is only forwarded to agents that have potential group members, and
wherein computer executable program code for the group definition further comprises: computer executable program code for enabling group synthesis without requiring explicit evaluation of the conditions at the group potential members.

17. The computer program product of claim 16 wherein computer executable program code for receiving the group definition further comprises:
computer executable program code for receiving an existing group definition to form a potential set of members; and
computer executable program code for receiving a set of conditions, which determine potential membership.

18. The computer program product of claim 16 wherein the computer executable program code for populating of group membership is separated from a definition of the group thereby reducing resource required in the absence of members.

19. The computer program product of claim 16 further comprising:
  computer executable program code for eliminating a cost of group synthesis during group definition by avoidance of performing group synthesis during group definition.

20. The computer program product of claim 16 wherein computer executable program code for receiving the group definition further comprises:
  computer executable program code for prompting a requester for the group definition; and computer executable program code for receiving the group definition.

21. The computer program product of claim 16 wherein computer executable program code for applying the sub-set of conditions to the group definition further comprises:
  computer executable program code for prompting a requester for a set of conditions; and
  computer executable program code for receiving the set of conditions to form a sub-set of conditions for determining potential membership.

22. The computer program product of claim 16 wherein computer executable program code for populating group membership further comprises one of:
  computer executable program code for adding a member to a group, wherein an addition sends a join message to a respective parent of the member incrementing a member count by one at the respective parent, wherein the join message is propagated to the respective parent and wherein the join message is asynchronous; and
  computer executable program code for removing a member from the group, wherein a removal sends a leave message to a respective parent of the member decrementing a member count by one at the respective parent, wherein the leave message is propagated to the respective parent and wherein the leave message is asynchronous.

23. The computer program product of claim 16 wherein computer executable program code for populating group membership further comprises:
  computer executable program code for aggregating information representative of an agent at a respective parent of associated agents at each level above the agent in an agent infrastructure, wherein aggregation occurs progressively as information passes upstream.

24. The computer program product of claim 16 wherein computer executable program code for populating group membership further comprises:
  computer executable program code for continuously evaluating membership at an agent of an entity.

25. The computer program product of claim 16 wherein computer executable program code for applying the sub-set of conditions to the group definition further comprises:
  computer executable program code for adding temporal conditions to the group definition.

26. The computer program product of claim 16 wherein computer executable program code for populating group membership further comprises:
  computer executable program code for forming of a set of group definitions interrelated by time, wherein each group definition in the set of group definitions is separated by a predetermined time interval to track group membership of a specific group definition over time.

27. The computer program product of claim 16 wherein computer executable program code for the group definition further comprises computer executable program code for an existing pre-defined set of group definitions providing a basis for further group definitions.

28. The computer program product of claim 16 wherein the group definition comprises persisted group definitions.

29. The computer program product of claim 16 wherein computer executable program code for populating group membership further comprises:
  computer executable program code for maintaining a count of group membership at each agent in an infrastructure and a parent of each agent.

30. The computer program product of claim 16 wherein computer executable program code for populating group membership further comprises:
  computer executable program code for combining receiving the group definition, applying the sub-set of conditions to the group definition, and populating group membership into a single message that is distributed within the agent infrastructure.

31. An apparatus for scalable group synthesis, the apparatus comprising:
  a communications fabric;
  a memory connected to the communications fabric, wherein the memory contains computer executable program code;
  a communications unit connected to the communications fabric; an input/output unit connected to the communications fabric; a display connected to the communications fabric; and
  a processor unit connected to the communications fabric, wherein the processor unit executes the computer executable program code to direct the apparatus to:
    receive a group definition;
    apply a sub-set of conditions to the group definition to form a conditioned group definition;
    receive a set of entities, wherein the set of entities includes threads of a parallel application; and
    populate group membership of threads using the received set of entities and the conditioned group definition, wherein each member includes at least one thread that responds in the affirmative to the sub-set of conditions,
    wherein the processor unit executes the computer executable program code to populate group membership further directs the apparatus to: filter the group definition in an agent infrastructure wherein the group definition is only forwarded to agents that have potential group members, and
    wherein the processor unit executes the computer executable program code of the group definition further directs the apparatus to: enable group synthesis without requiring explicit evaluation of the conditions at the group potential members.

32. The apparatus of claim 31 wherein the processor unit executes the computer executable program code to receive the group definition further directs the apparatus to:
  receive an existing group definition to form a potential set of members; and
  receive a set of conditions which determine potential membership.

33. The apparatus of claim 31 wherein the processor unit executes the computer executable program code to further direct the apparatus to populate group membership separate from a definition of the group thereby reducing resource required in the absence of members.

34. The apparatus of claim 31 wherein the processor unit executes the computer executable program code to further direct the apparatus to:

eliminate a cost of group synthesis during group definition by avoidance of performing group synthesis during group definition.

35. The apparatus of claim 31 wherein the processor unit executes the computer executable program code to receive the group definition further directs the apparatus to:
   prompt a requester for the group definition; and
   receive the group definition.

36. The apparatus of claim 31 wherein the processor unit executes the computer executable program code to apply the sub-set of conditions to the group definition further directs the apparatus to:
   prompt a requester for a set of conditions; and
   receive the set of conditions to form a sub-set of conditions for determining potential membership.

37. The apparatus of claim 31 wherein the processor unit executes the computer executable program code to populate group membership further directs the apparatus to one of:
   add a member to a group, wherein an addition sends a join message to a respective parent of the member incrementing a member count by one at the respective parent, wherein the join message is propagated to the respective parent and wherein the join message is asynchronous; and
   remove a member from the group, wherein a removal sends a leave message to a respective parent of the member decrementing a member count by one at the respective parent, wherein the leave message is propagated to the respective parent and wherein the leave message is asynchronous.

38. The apparatus of claim 31 wherein the processor unit executes the computer executable program code to populate group membership further directs the apparatus to:
   aggregate information representative of an agent at a respective parent of associated agents at each level above the agent in an agent infrastructure, wherein aggregation occurs progressively as information passes upstream.

39. The apparatus of claim 31 wherein the processor unit executes the computer executable program code to populate group membership further directs the apparatus to:
   continuously evaluate membership at an agent of an entity.

40. The apparatus of claim 31 wherein the processor unit executes the computer executable program code to apply the sub-set of conditions to the group definition further directs the apparatus to:
   add temporal conditions to the group definition.

41. The apparatus of claim 31 wherein the processor unit executes the computer executable program code to populate group membership further directs the apparatus to:
   form a set of group definitions interrelated by time, wherein each group definition in the set of group definitions is separated by a predetermined time interval to track group membership of a specific group definition over time.

42. The apparatus of claim 31 wherein the processor unit executes the computer executable program code of the group definition further directs the apparatus to an existing predefined set of group definitions providing a basis for further group definitions.

43. The apparatus of claim 31 wherein the group definition includes persisted group definitions.

44. The apparatus of claim 31 wherein the processor unit executes the computer executable program code to populate group membership further directs the apparatus to:
   maintain a count of group membership at each agent in an infrastructure an a parent of each agent.

45. The apparatus of claim 31 wherein the processor unit executes the computer executable program code to populate group membership further directs the apparatus to:
   combine receiving the group definition, applying the sub-set of conditions to the group definition and populating group membership into a single message that is distributed within the agent infrastructure.

\* \* \* \* \*